United States Patent [19]

Okamoto et al.

[11] Patent Number: 5,434,787
[45] Date of Patent: Jul. 18, 1995

[54] SYSTEM FOR MEASURING POSITION BY USING GLOBAL POSITIONING SYSTEM AND RECEIVER FOR GLOBAL POSITION SYSTEM

[75] Inventors: Naoki Okamoto, Nara; Takeshi Okamoto, Nabari; Masao Miyazaki, Nara; Tomozo Ohta, Ikoma, all of Japan

[73] Assignee: Sharp Kabushiki Kaisha, Osaka, Japan

[21] Appl. No.: 866,021

[22] Filed: Apr. 8, 1992

[30] Foreign Application Priority Data

Apr. 12, 1991 [JP] Japan .................. 3-080062
Apr. 12, 1991 [JP] Japan .................. 3-080063

[51] Int. Cl.6 ........................................... G06F 165/00
[52] U.S. Cl. ................................. 364/449; 342/357
[58] Field of Search ............ 364/459, 449, 458, 424.04, 364/460; 342/357, 450, 451, 463, 457, 358

[56] References Cited

U.S. PATENT DOCUMENTS 4,578,678 3/1986 Hurd .................................. 343/357
5,119,102 6/1992 Barnard .............................. 342/357
5,148,452 9/1992 Kennedy et al. ...................... 375/96
5,155,490 10/1992 Spradley, Jr. et al. ............. 342/457
5,365,450 11/1994 Schuchman et al. ................ 364/449

FOREIGN PATENT DOCUMENTS 0155776 2/1985 European Pat. Off. .
221093 8/1990 Japan .

Primary Examiner—Michael Zanelli
Attorney, Agent, or Firm—David G. Conlin; Milton Oliver

[57] ABSTRACT

A GPS position measuring system includes at least one mobile station and a base station associated with the mobile station. The mobile station is provided with an antenna for receiving one or more GPS signals from the corresponding GPS satellites, an amplifying and frequency converting circuit for amplifying the received signal and converting the amplified GPS signal into a signal on an IF band, an analog-to-digital converter for converting the signal on the IF band into a digital signal, and a writing unit for writing the digital signal into a memory card in order to transfer the digital signal to the base station.

9 Claims, 7 Drawing Sheets

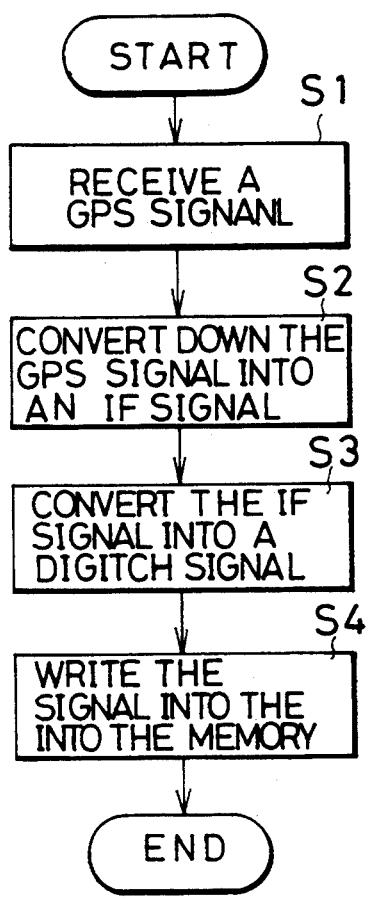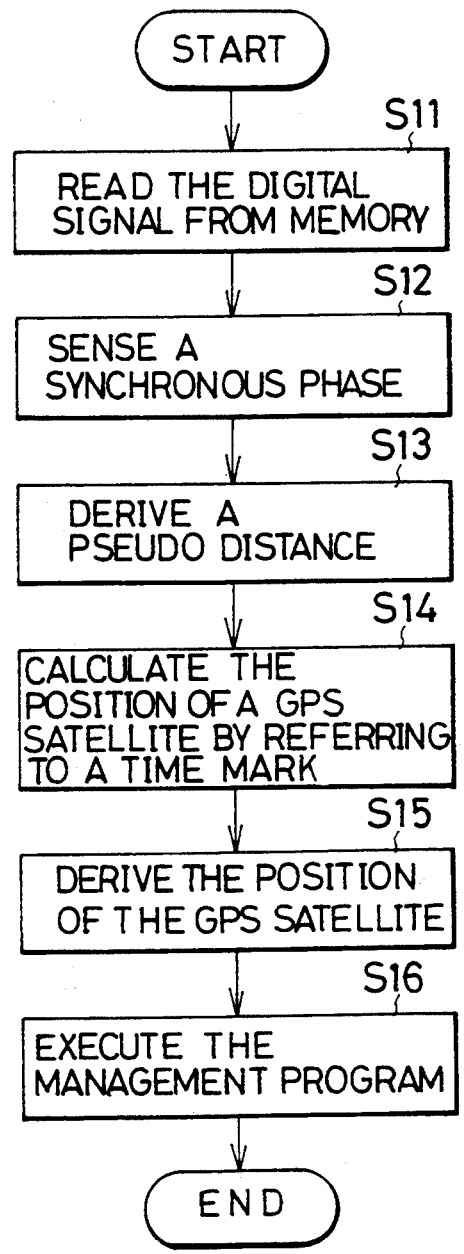

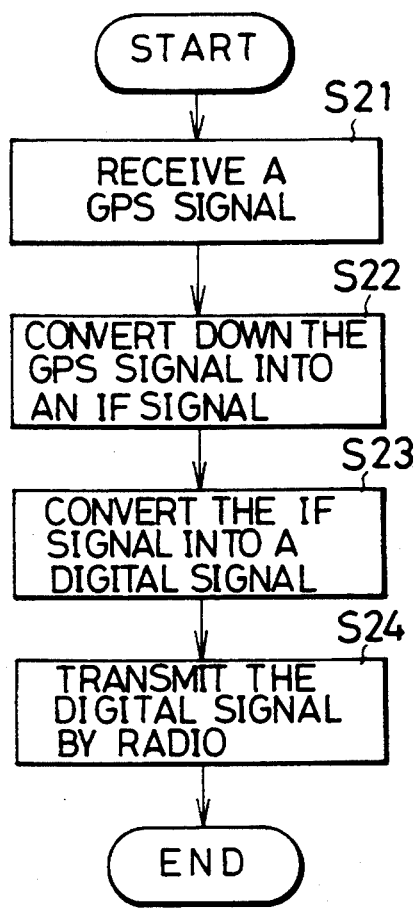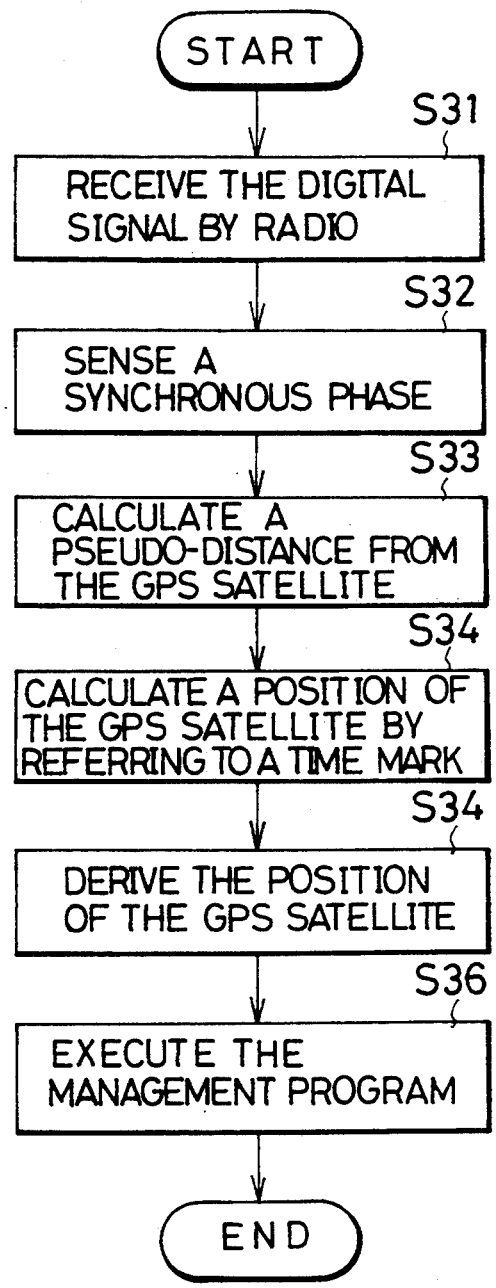

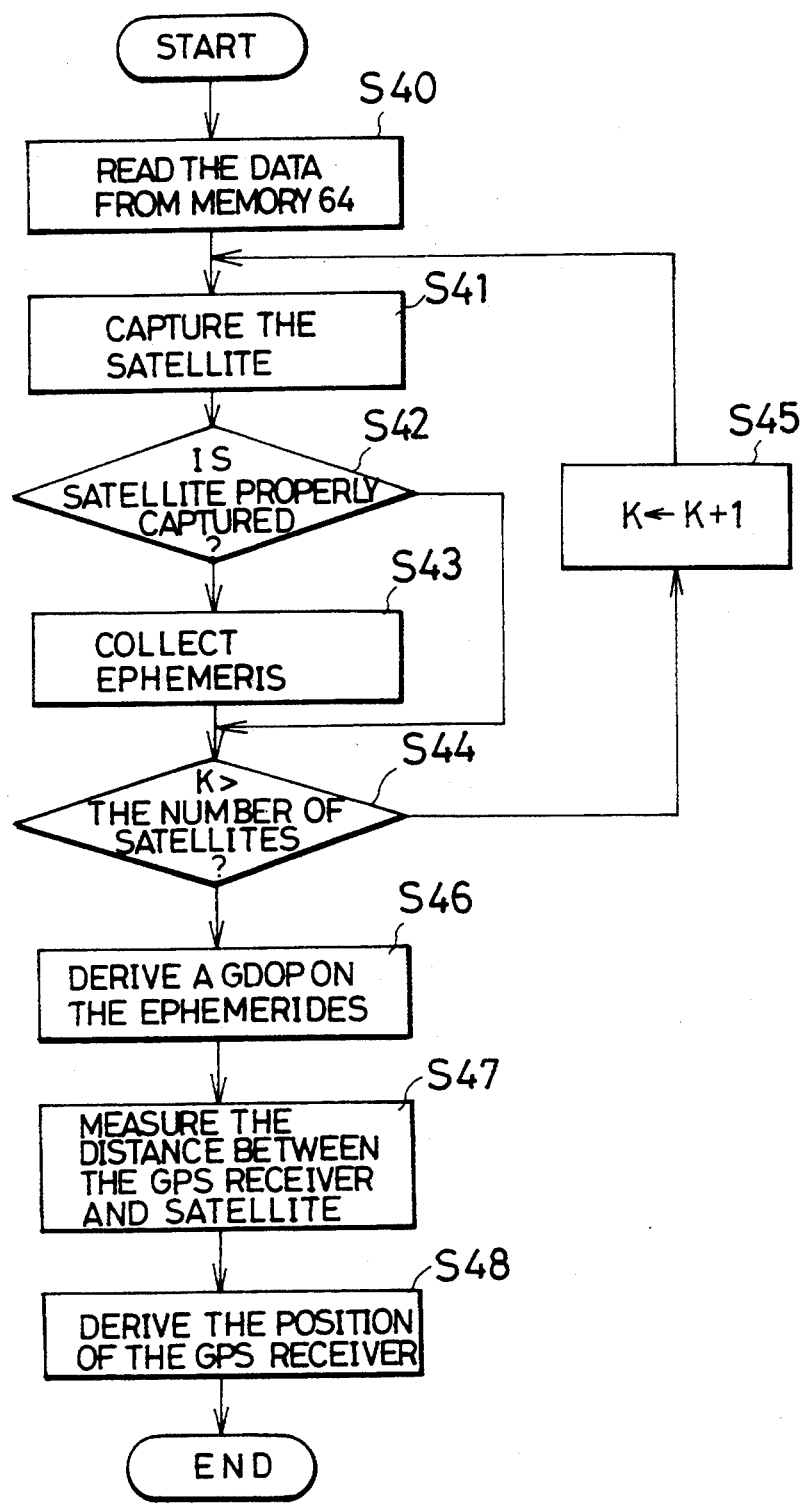

SYSTEM FOR MEASURING POSITION BY USING GLOBAL POSITIONING SYSTEM AND RECEIVER FOR GLOBAL POSITION SYSTEM

BACKGROUND OF THE INVENTION

1. Field of the Invention

The present invention relates to a system for measuring a current position of an automobile or the like by using a global positioning system (GPS) and a receiver for the GPS system.

2. Description of the Related Art

A great deal has been placed on an NAVSTAR (Navigation System with Time and Range)/GPS which has been developed and used in the U.S. Army, because this system is capable of measuring a position of a target object at any place and time in the world. In recent days, a GPS receiver unit as well as a car navigation system provided with the GPS receiver have been made commercially available. In the near future, the GPS receiver may be used in other commercial applications.

The GPS known by the present inventors is designed to capture an electromagnetic wave transmitted from a GPS satellite going around the earth and maintaining a highly accurate orbit, measure the time when the wave reaches the GPS, and measure the distance between the GPS satellite and the receiving mobile station (user) based on the measured time. The similar measurement is carried out in the other two GPS satellites for deriving the position of the mobile station.

The unknown position of the mobile station can be derived by the positions of the three GPS satellites obtained from the orbit information and the measured distances from the station to each GPS satellite.

Even if the foregoing process is carried out with respect to these three GPS satellites, the measured time has an uncertain component. Hence, by treating a time lag $\Delta t$ as one variant and capturing the positions of the four GPS satellites, it is possible to accurately measure the position of the GPS mobile station.

The GPS has a capability of measuring the position with high precision of about several tens to hundred of meters. Hence, the mobile station is capable of grasping the position of itself and the base station for managing two or more mobile stations loaded on a car, and for example, is also capable of managing the position of each mobile station. The managing result is used for managing an everyday operation range or providing a service for a user.

The following description will be directed to the known GPS position measuring system.

A GPS signal is received through a receiving antenna. The received signal is sent to an amplifying and frequency converting circuit in which the signal is amplified and then is converted into a signal on an IF (Intermediate Frequency) band (referred to as an IF signal). The resulting signal is sent to an analog-to-digital converter. In the A/D converter, the signal is directly converted into a digital signal or the base-band signal is converted into a digital signal. The digital signal is sent to a digital signal processing circuit in which a spectrum back-diffusion process, a digital demodulating process and a position measuring process are carried out with respect to the digital signal for deriving the data about the measured distance and the satellite orbit.

Four GPS satellites are required for measuring the position of a target object. Hence, at first, four satellites are selected from all GPS satellites which can be captured. As a determining criterion for the selection, a GDOP (Geometrical Dilution of Precision) is used. The GDOP is a coefficient standing for a geometrical precision degradation.

In the selecting process, at first one GPS satellite is captured so that a signal received from the captured GPS satellite is converted to the corresponding digital signal and collection of pieces of data about orbits of all the GPS satellites is performed. The collective data are referred to as an "almanac". From the almanac, the GDOP is derived. On the derived GDOP, the four satellites are so selected that the measuring error is minimized in the selected combination.

From the selected four satellites, the GPS signals are received for collecting ephemerides (data about orbits of the selected satellites). In the case that at least one of the GPS signals is not adequately received from the corresponding satellite due to the adverse effect of an obstacle, the combination of the satellites bringing the GDOP to the second smallest value is selected. Then, the foregoing process is carried out with respect to the selected combination. Next, with a correlation pulse, a pseudo-distance between the GPS receiver and each satellite is derived. To improve the measuring precision, it is better to, use the GPS signals received simultaneously for deriving each pseudo-distance. Hence, the recent prior art GPS receiver is required to provide digital signal processing circuits corresponding to four or more channels.

The data about the pseudo-distances and satellite orbits obtained by the above process are applied to a position deriving circuit for calculating a position of each satellite, solving a quadratic equation, and performing the coordinate conversion, the statistical processing and the like. As a result of performing the processing, the measured position (latitude, longitude and height, for example) of the GPS receiver itself can be obtained.

In such a GPS position measuring system applied for managing a promotion of an automobile, the position data is sent to a writing unit in which the data is written to a memory card (or IC card) together with a measuring time. The position data and the measuring time are sequentially written on the memory card.

The memory card containing the position data and the measuring times accumulated thereon is transferred to the base station. The memory card is inserted to the reading unit for reading the position data and the measuring times from the card. The data is sent to a computer having a operation managing program built therein. In the computer, for example, the one-day operation management of the car is derived from the data.

The foregoing related art provides a circuit for processing a GPS signal and a circuit for deriving the position of the mobile station on each mobile station. It means that each mobile station is required to have a numerically control oscillator (NCO), a digital signal processor (DSP), a 16-bit central processing unit (CPU), a numerical processor and the like. Further, for measuring the position of the mobile station, it is necessary to prepare the four or more channels or use a high-speed IC for operating one channel at high speed. As a result, each mobile station needs large and costly hardware. It is difficult and disadvantageous, in light of the cost, to provide such a mobile station or a GPS receiver in each one of a lot of cars.

Next, the description will be directed to a data format of a GPS signal sent from a satellite. The GPS data is composed of repetitive master frames. One master frame consists of 25 pages (main frames). One page consists of five sub frames. Each sub frame is arranged to have 300 bits. For example, the first sub frame contains an amending coefficient about a timer of the satellite, the second and the third sub frames contain the orbit data of the satellite, and the fourth and the fifth sub frames contain the almanac and an amending coefficient about an ionospheric layer, ant etc.. Since the first to the third sub frames are completed at each page, all the orbit data of the GPS satellite is contained in one page. On the other hand, the fourth and the fifth sub frames are arranged to be completed at each frame master. That is, the remaining part of the almanac, or the orbit data of another GPS satellite is arranged to be dispersed in each page. It means that the orbit data about all the satellites can be obtained over 25 pages.

Since the bit rate is 50 bps, 30 seconds are needed for reading one page. That is, for reading one master frame, 12.5 minutes are needed. It means that for obtaining the almanac, it is necessary to receive a GPS signal for as long a time as 12.5 minutes. Consider a portable GPS receiver. To receive the almanac data, the receiver is required to support its receiving antenna directed toward the sky for 12.5 minutes or more. This is impractical. Further, it takes 12.5 minutes or longer to measure the position of the target object. This is a long time.

To overcome the foregoing shortcomings, it has been considered that the digital signal processing circuits corresponding to the satellites (6 to 8) located within a signal-receivable field are prepared, the one-frame data is received from all the satellites located within the receivable field, and the DGOP is derived by using the data in place of the almanac. To employ this arrangement, it is possible to reduce the receiving time to about 30 seconds. However, it is technically impractical to provide such a number of channels in the receiver in light of the hardware arrangement. If such channels may be provided, the resulting receiver becomes very costly. Hence, this arrangement is impractical, in light of the hardware and the cost.

SUMMARY OF THE INVENTION

It is therefore a first object of the present invention to provide a GPS-based system, for measuring a position, and a mobile station provided in the GPS-based system, and a base station provided in the GPS-based system which are capable of reducing the overall amount and cost of the required hardware.

It is the second object of the present invention to provide the GPS receiver which is capable of greatly reducing the time needed for measuring a position of a GPS receiver itself without having to increase the hardware amount.

In carrying out the first object, the GPS-based position measuring system according to the invention includes at least one mobile station and a base station associated with a the mobile stations. The mobile station is provided with mechanism for receiving a GPS signal from: a GPS satellite, a mechanism for converting the received GPS signal into a signal on an intermediate-frequency (IF) band, a mechanism for converting the analog signal on the IF band into a digital signal; and a mechanism for processing the digital signal in order to transfer the processed signal to the base station. The base station is provided with a mechanism for deriving a position of the mobile station by using the digital signal transferred from the mobile station to the base station.

Preferably the processing mechanism includes a mechanism for storing a digital signal converted by the converting mechanism.

The storing mechanism is one of a memory card, an IC card, another type of semiconductor storage device, and a magnetic medium.

Throughout the specification, the mobile station denotes a GPS device located at the place to be measured. The mobile station may be moving or stationary.

In operation, the mobile station serves to convert the GPS signal received from the GPS satellite into an IF signal and sample and quantize the IF signal for producing a digital signal. Then, the digital signal is sent to the base station. That is, the digital signal is stored on a storage medium or is transmitted by radio. The base station operates to measure the position of the base station itself based on the digital signal stored on the storage medium or received by radio In carrying out the second object, the GPS receiver according to the present invention includes a mechanism for receiving a plurality of GPS (Global Positioning System) signals from a plurality of GPS satellites, a mechanism for converting a signal involving the received GPS signals into an IF signal, a mechanism for converting the IF analog signal into a digital signal, a mechanism for storing the converted digital signal before signal processing with respect to deriving a position of the GPS receiver, a mechanism for reading the digital signal from the storing mechanism, and a mechanism for deriving the position of the GPS receiver by using the read digital signal.

Further, it is preferable that the reading mechanism is arranged to read the digital signal from the storing mechanism at a faster speed than the writing speed to the storage mechanism.

In operation, the GPS signal received from the GPS satellite is converted into an IF signal. The IF signal is quantized for converting the signal into a digital signal. The digital signal corresponding to any period of time is temporarily stored in the storing mechanism. Then, the digital signal read from the storing mechanism is processed on the time series for performing the measurement of the position. Such time-series processing is equivalent to preparation of a multi-channel digital signal processing unit and allows the data about each satellite to be collected, resulting in eliminating the necessity of the almanac. Hence, the GPS receiver of this invention does not need to consume a large period of time for collecting the almanac. This results in reducing the measuring time to a quite short time without having to increase the hardware amount. By making the reading speed of a digital signal from the storing mechanism faster than the writing speed of the digital signal to the storage mechanism, it is possible to reduce the measuring time to a far shorter time.

Further objects and advantages of the present invention will be apparent from the following description of the preferred embodiments of the invention as illustrated in the accompanying drawings.

BRIEF DESCRIPTION OF THE DRAWINGS

FIG. 4 is a flowchart showing a flow of data process done on the mobile station included in the GPS system shown in FIG. 1;

FIG. 5 is a flowchart showing a flow of data process done on the base station included in the GPS system shown in FIG. 1;

FIG. 8 is a flowchart showing a flow of data process done on the mobile station included in the GPS system;

FIG. 9 is a flowchart showing a flow of data process done on the base station included in the GPS system;

FIG. 11 is a flowchart showing a flow of data process done in the embodiment shown in FIG. 10.

DESCRIPTION OF THE PREFERRED EMBODIMENTS

Figure 1:
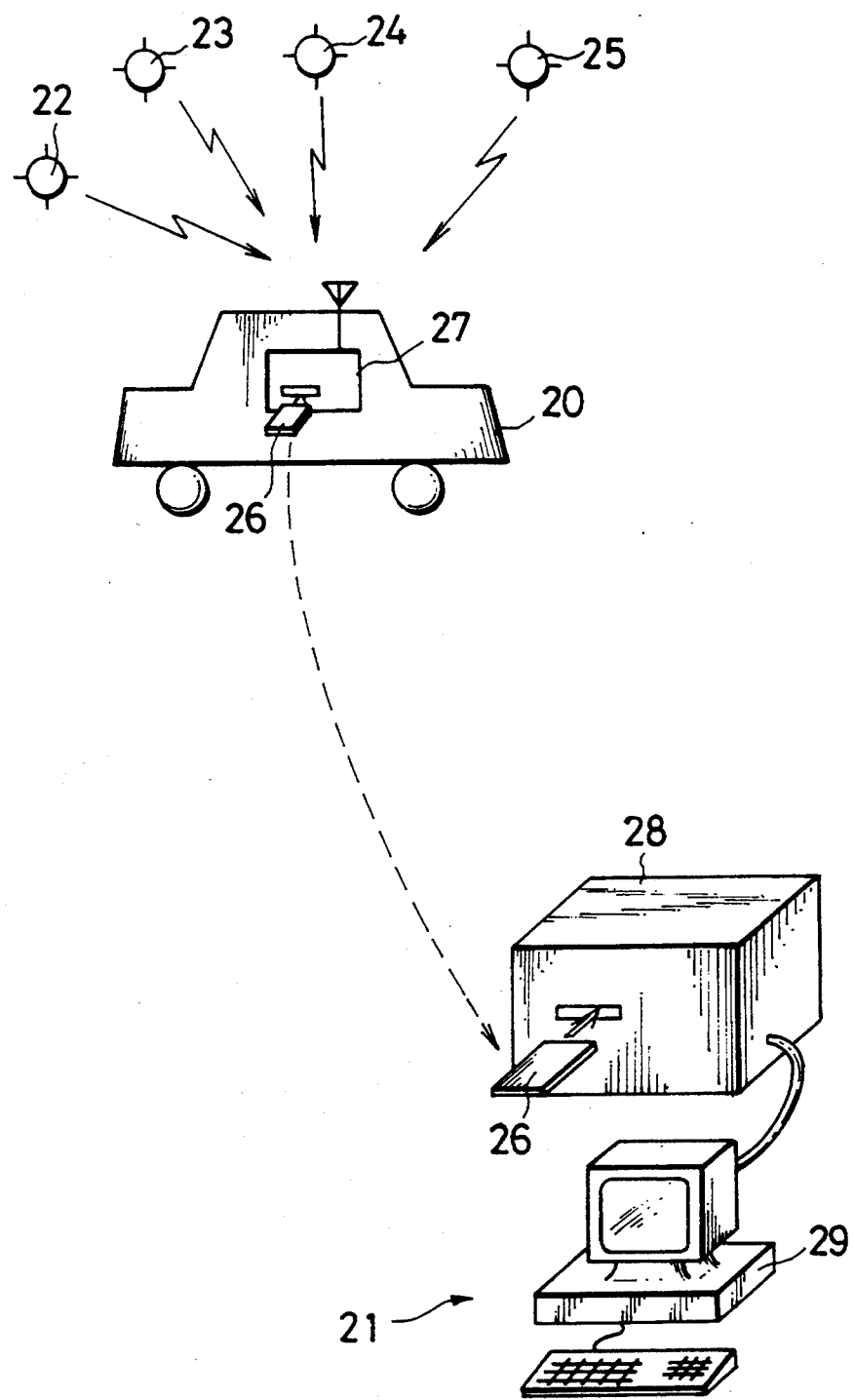
FIG. 1 is an illustration schematically showing an arrangement of a GPS system according to an embodiment of the present invention.

Hereinafter, an embodiment of the invention will be described in detail as referring to the drawings.

FIG. 1 is an illustration schematically showing an arrangement of a system for managing the operation of a car such as a taxi. A mobile station 20 is a car and a base station 21 is a managing office for the car. The mobile station 20 provides a mobile-station device 27 which is arranged to receive GPS signals from the GPS satellites 22, 23, 24, and 25, convert the GPS signals into a signal on an IF signal, sample and quantize the IF signal for producing a digital signal, and write the digital signal into a memory card (or IC card) 26. The GPS satellite employs a spectrum diffusion communication system. On the other hand, the base station 21 provides a base-station device 28 which is arranged to read the data from a memory card, process the digital signal of the GPS, and derive a position of the mobile station 20 and a personal computers 29 which operates to manage the operation based on the data about the measured position and the measuring time.

Figure 2:
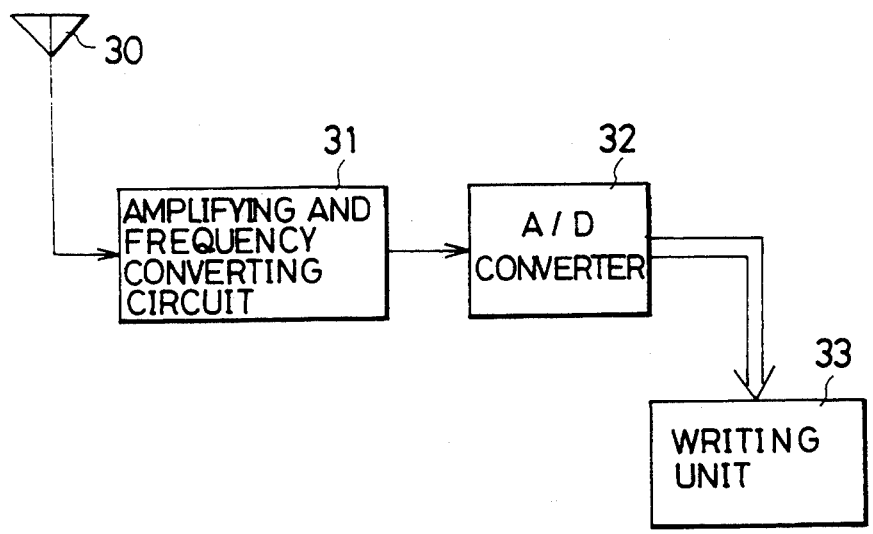
FIG. 2 is a block diagram showing an arrangement of a mobile-station device included in the GPS system shown in FIG. 1.

FIG. 2 is a block diagram showing the mobile-station device 27 provided in the system shown in FIG. 1.

The mobile-station device is provided with an antenna 30, an amplifying and frequency converting circuit 31, an analog-to-digital (A/D) converter 32, and a writing unit The GPS signal is received from the GPS satellite to the device through the antenna 80. The amplifying and frequency converting circuit 31 contains a pre-amplifying section for amplifying the received GPS signal. Then, the circuit 31 operates to convert the amplified signal into the IF signal. The IF signal is sent to the A/D converter 32. In the converter 32, the IF signal is converted into a digital signal. The writing unit 33 serves to directly write the digital signal onto a memory card 26 (see FIG. 1). A local oscillating signal (not shown) is applied to the circuit 31. The signal is produced in an oscillator (not shown).

Figure 3:
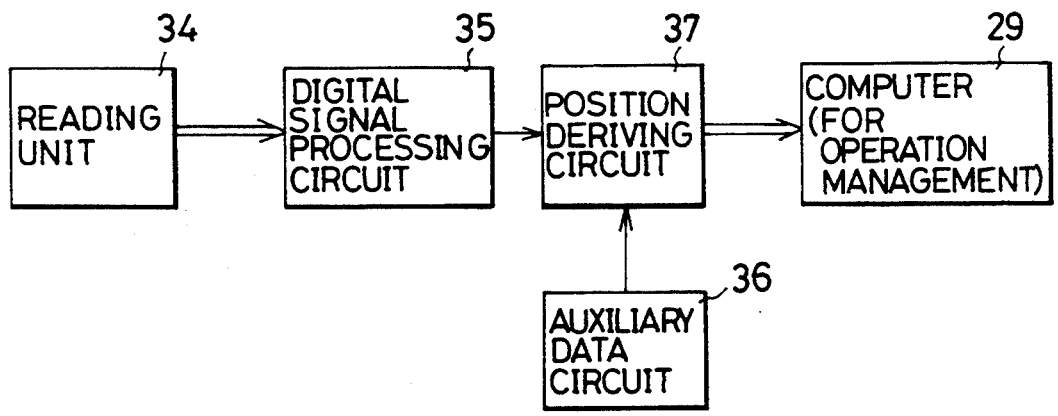
FIG. 3 is a block diagram showing an arrangement of a base-station device included in the GPS system shown in FIG. 1.

FIG. 3 is a block diagram showing a base-station device 28 included in the system shown in FIG. 1. As shown, the base-station device 28 is provided with a reading unit 34, a digital signal processing circuit 35, a position deriving circuit 37, an auxiliary data circuit 36 and a computer 29. The reading unit 34 serves to read a digital signal stored in the memory card 26 (see FIG. 1). The digital signal processing circuit 35 operates to sense a synchronous phase about each of the GPS satellites 22, 23, 24 and 25 and derive pseudo-distances from all of the GPS satellites. The position deriving circuit 37 operates to derive the data about the measured position based on the derived pseudo-distance and the position data of each GPS satellite given by the auxiliary data circuit 36. The personal computer 29 manages the operation based on the data about the measured position and the measuring time.

FIGS. 4 and 5 are flowcharts showing a flow of data process done in the mobile station and the base station.

On the mobile station, the program shown in FIG. 4 is executed at a given interval and a digital signal is recorded on the memory card.

At a step S1, a signal is received from each of the GPS satellites 22, 23, 24 and 25 through the antenna 30. At a step S2, the RF (Radio Frequency) signal is converted down to the IF signal in the amplifying and frequency converting circuit 31. The IF signal converted in the circuit 31 is a signal obtained by modulating a carrier by means of a BPSK (Bi-Phase Shift Keying) method. The GPS receiver employs the spectrum diffusion communication system in which the GPS signals sent from the GPS satellites (located within a signal-receivable field of view) are located on the band in an overlapping manner.

At a step S3, the IF signal formed in an overlapped manner is converted into a digital signal in the A/D converter 32. Proceeding to a next step S4, the relevant data is recorded on the memory card 26. The data contains this digital signal on a carrier level and a time mark indicating when the signal is collected (for example, a digital value indicating hour minute **second).

On the base station 21, the mobile station 20 is returned there so that the memory card 26 may be brought into the base-station device 28. Then, the program shown in FIG. 5 is executed.

At a step S11, the digital data recorded on the memory card 26 is read from the reading unit 34. In the reading process, all the digital data may be stored in memory (not shown). Preferably the successive process is executed by reading a part of data from the memory. The digital data at a given interval may be read from the memory card each time the later process is executed.

At a next step S12, the diffusion code for each of the GPS satellites 22, 23, 24 and 25 (located within a signal-receivable field of view) is multiplied by the read digital data for sensing the synchronous phase of each satellite in the digital signal processing circuit 35. At a step S13, the digital signal processing circuit 35 serves to measure the time when an electromagnetic wave from each GPS satellite reaches the mobile station 20 and derive a pseudo-distance between each of the four GPS satellites 22, 23, 24 and 25 and the mobile station based on the measured time.

At a next step S14, the position of each GPS satellite is calculated from the orbit information about each GPS satellite and the read-out time mark. The calculation is carried out in the auxiliary data circuit 36. Proceeding to a step S15, the position of the mobile station 20 is derived on the basis of the pseudo-distances from the four satellites for deriving the data about the measured position (latitude, longitude, and height, for example).

Assuming that C is the speed of light and s is an influence amount against the measured distance effected by the time lag $\Delta t$, the unknown X, Y and Z about the position of the mobile station 20 and the influence amount s against the measured distance are carried out by solving the following simultaneous equations.

$$(x_1 - X)^2 + (y_1 - Y)^2 + (z_1 - Z)^2 = (r_1 + s)^2$$
$$(x_2 - X)^2 + (y_2 - Y)^2 + (z_2 - Z)^2 = (r_2 + s)^2$$
$$(x_3 - X)^2 + (y_3 - Y)^2 + (z_3 - Z)^2 = (r_3 + s)^2$$
$$(x_4 - X)^2 + (y_4 - Y)^2 + (z_4 - Z)^2 = (r_4 + s)^2$$

wherein the positions of the four GPS satellites 22, 23, 24, 25 obtained from the orbit data and the time mark are (x1, y1, z1), (x2, y2, z2), (x3, y3, z3) and (x4, y4, z4) and the measured pseudo-distances about the GPS satellites 22, 23, 24, 25 are r1, r2, r3 and r4.

At a next step S16, the data (latitude, longitude, height, for example) about the measured position at the measured time is sent to the computer 29 having a program for managing the operation. The computer 29 operates to manage the operation of the mobile station 20 based on the data about the measured position at each time serially being input.

As set forth above, this embodiment is arranged so that the mobile station 20 may transmit a digital signal on a carrier level to the base station 21 without having to perform the GPS operation about the measured distance and position. Hence, the mobile station 20 does not need a synchronism capturing and following unit with a DLL loop, a demodulating unit for the BPSK data, and the position deriving unit. Since the synchronous phase is sensed without obtaining the orbit data from the data given on the mobile station 20, it is unnecessary to essentially demodulate the BPSK data. It means that the length of the recorded data is as short as several milliseconds/read to several tens milliseconds/read so that the information may be read in a memory such as a memory card. As a result, each mobile station does not need to provide a numerical control oscillator, a digital signal processor, a 16-bit central processing unit, a numerical processor and the like. The removal of those components results in making the mobile station small-sized, lightweight and less costly.

Figure 6:
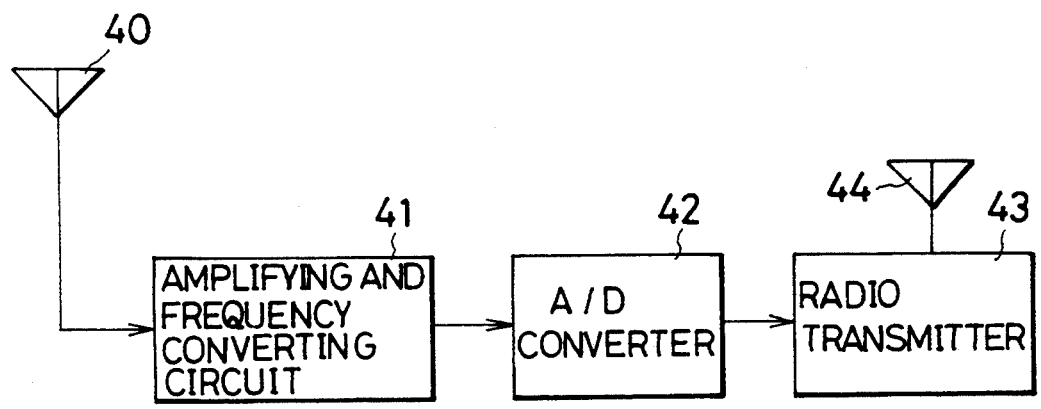
FIG. 6 is a block diagram showing an arrangement of a mobile-station device included in a GPS system according to another embodiment of the present invention.

FIG. 6 is a block diagram showing a mobile-station device according to another embodiment of the present invention.

As shown, the mobile-station device is provided with an antenna 40, an amplifying and frequency converting circuit 41, an analog-to-digital (A/D) converter 42, and a radio transmitter 43. The antenna 40 is used for receiving a GPS signal transmitted from the GPS satellite. The circuit 41 contains a pre-amplifying section for amplifying the received GPS signal. The circuit 41 serves to convert the amplified GPS signal into an IF signal. The A/D converter 42 serves to convert the IF signal into a digital. The radio transmitter 43 serves to transmit the digital signal to the base station through the antenna 44. Though not shown, a local oscillating signal is applied to the circuit 41. The local signal is synthesized in an oscillator (not shown).

Figure 7:
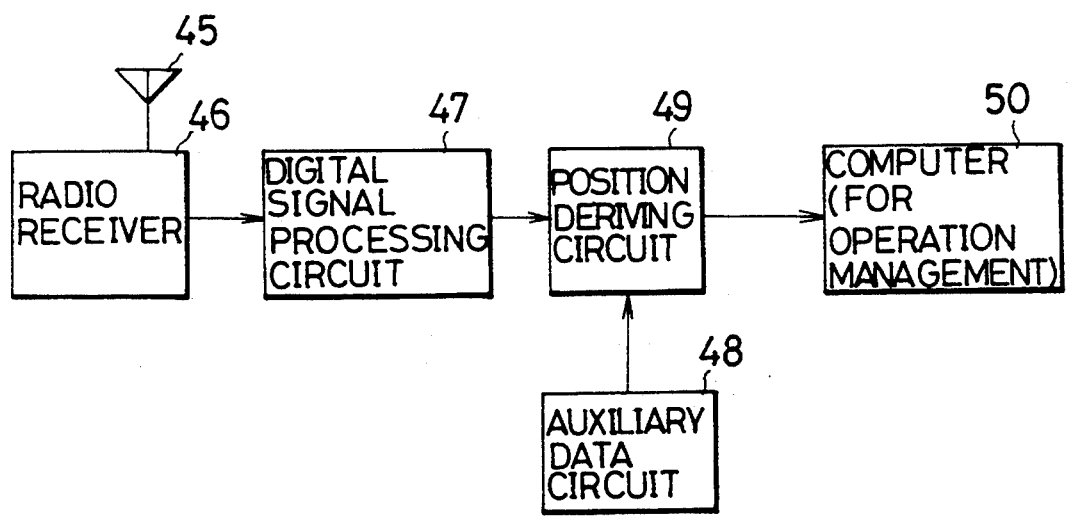
FIG. 7 is a block diagram showing an arrangement of a mobile-station device included in the GPS systems.

FIG. 7 is a block diagram showing the base-station device according to this embodiment. The base-station device is provided with an antenna 45, a radio receiver 46, a digital signal processing circuit 47, a position deriving circuit 49, and a personal computer 50. The radio receiver 46 serves to receive the data transmitted from the mobile station through the antenna 45. The digital signal processing circuit 47 operates to sense a synchronous phase about each GPS satellite and derive a pseudo-distance from each GPS satellite. The position deriving circuit 49 serves to derive the measuring data based on the derived pseudo-distance and the data about the position of each GPS satellite given by an auxiliary data circuit 48. The personal computer 50 manages the operation of the mobile station based on the measuring data and the measured time.

FIGS. 8 and 9 are flowcharts showing a flow of data done in the mobile station and the base station according to the embodiment of the present invention, respectively.

On the mobile station, the program shown in FIG. 8 is executed at a given interval so that the data is transmitted to the base station.

The processes at the steps S21 to S23 of FIG. 8 are the same as those at the steps S1 to S3 of FIG. 4. At a step S24, a digital signal on the carrier level and the time mark is transmitted by the radio transmitter 43 without being processed. The time mark stands for when the signal is collected from the GPS satellite. The radio transmitter 43 may be a mobile phone or another radio means. In a taxi, for example, a taxi radio may be used for simplifying the overall arrangement.

The program shown in FIG. 9 is executed on the base station.

At a step S31, the base station receives the foregoing data transmitted from the mobile station. Then, the processes at the steps S32 to S36 are executed. The processes at the step S32 to S36 are the same as those at the steps S12 to S16 of FIG. 5.

Like the embodiment of FIG. 3, the GPS position measuring system according to this embodiment does not need to provide a numerical control oscillator, a digital signal processor, a 16-bit central processing unit and a numerical processor. Hence, the mobile station is made small-sized, lightweight and less costly. As another advantage, this system is capable of grasping the position of the mobile station in an online manner so that the taxis, for example, are allowed to be efficiently operated. By returning the position of each mobile station from the base station to the mobile station by radio, each mobile station enables to know its position or the position of another mobile station.

In the foregoing embodiments, the present invention may apply to management of operations of the cars. However, the present invention may apply to management of various mobiles such as management of mount climbers and flight orbits of a hung glider, for example.

The means for transferring the digital signal to the base station may be a memory card, an IC card, another type of semiconductor storage means, a magnetic medium such as a magnetic tape and a magnetic disk, and another type of recording medium except the magnetic and semiconductor media. The transferring means may be a radio means except a surface radio, an optical means such as a ray of light or a laser beam, or a wire means.

Hereafter, the description will be directed to a second embodiment of the present invention.

Figure 10:
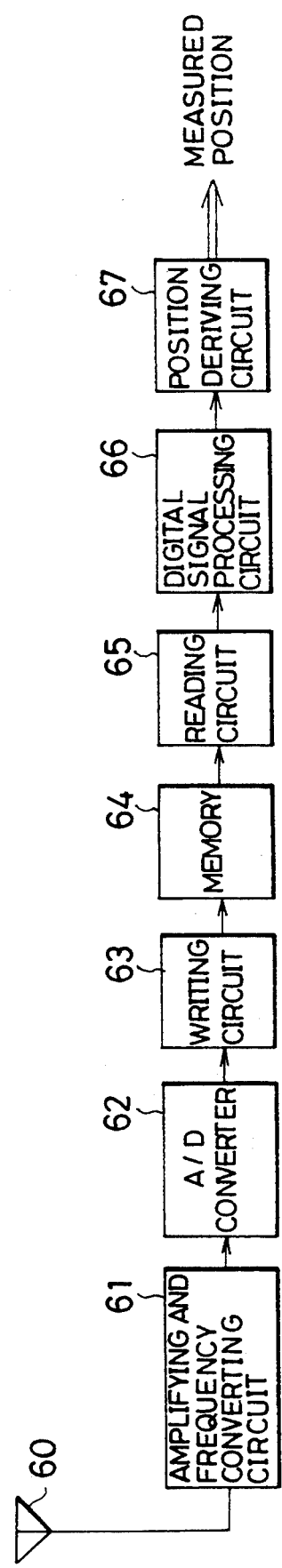
FIG. 10 is a block diagram showing an arrangement of a GPS receiver according to an embodiment of the present invention.

FIG. 10 is a block diagram schematically showing an arrangement of a GPS receiver according to the embodiment of the present invention. As shown, The GPS receiver is provided with an antenna 60 through which a GPS signal is received from a GPS satellite, an amplifying and frequency converting circuit 61, an analog-to-digital (A/D) converter 62, a writing circuit 63, a memory 64, a reading circuit 65, a digital signal processing circuit 66, and a position deriving circuit 67. The amplifying and frequency converting circuit 61 has a pre-amplifying section for amplifying the received GPS signal and converts the amplified signal into an IF (intermediate frequency) signal. The IF signal is sent to the A/D converter 62 which serves to convert the IF signal into a digital signal. The writing circuit 63 serves to write the digital signal extending for a certain period of time, for example, 30 seconds (corresponding to about one page (one main frame)) into the memory 64 such as an IC memory. The reading circuit 65 serves to read the written digital signal from the memory 64. The digital signal processing circuit 66 operates to perform the reverse diffusion of the written digital signal by using a diffusion code for each GPS satellite located within a receivable field for the purpose of demodulating the data from the signal. The demodulated data contains ephemerides (data about a satellite orbit) of all the satellites and a pseudo-distance from each of all the satellite. The position deriving circuit 67 serves to derive the position of a GPS receiver itself from the derived pseudo-distance and the data about a satellite orbit. Though, not shown, a local oscillating signal is applied to the circuit 61. The local oscillating signal is synthesized in an oscillator (not shown).

FIG. 11 is flowcharts showing a flow of data process done in this embodiment.

As shown in FIG. 4, at the step S1, the signal is received from each GPS satellite located within the signal-receivable field through the antenna 60. At the step S2, the RF (radio frequency) signal is converted down to the IF signal. The IF signal converted in the circuit 61 is a signal obtained by modulating a carrier in a BPSK (Bi-Phase Shift Keying) system. The GPS receiver employs the spectrum diffusion communication system in which the GPS signals sent from the GPS satellites are located on the band in an overlapping manner. The IF signal composed of all the overlapped signals is sampled and quantized in the A/D converter 62 for obtaining a digital signal at the step S3. Proceeding to the step S4, the reading circuit 63 serves to write a digital signal to the memory 64 for a certain period of time, for example, 30 seconds (corresponding to about one page).

Next, the operation shown in FIG. 11 is executed. At a step S40, the reading circuit 65 serves to read the digital signal from the memory 64.

Proceeding to a step S41, a diffusion code for one of all the GPS satellites located within a receivable field is multiplied by the read digital data. The reverse diffusion is carried out with respect to the multiplied result for sensing the synchronous phase of the satellite (capturing the satellite). At a step S42, it is determined whether or not the satellite is properly captured. In case of yes, at a step S43, the ephemeris (data about a satellite orbit) of this satellite is collected from the data for one page. Then, the process goes to a step S44. In case that the satellite is not properly captured, the process skips the step S43 and goes to a step S44.

At the step S44, it is determined how many times the process from the steps S41 to S43 is carried out and whether or not the time K (for example, 8) is more than the number of all the GPS satellites. If the time K is not more than the number of all the GPS satellites, at a step S45, K is incremented by one and then the process at the steps S41 to S43 is repeated.

After the ephemerides all the receivable GPS satellites are collected, the process goes to a step S46. At this step, the GDOP is derived from those ephemerides. On the derived GDOP, the four satellites are selected so that a measuring error may become minimum. Proceeding to a step S47, each pseudo-distance between a GPS receiver and each of the selected four satellites is derived on the basis of the data about each satellite. The processes done at the steps S41 to S47 are carried out in the digital signal processing circuit 66.

At a step S48, the position deriving circuit 67 serves to operate the position of the GPS receiver based on the derived pseudo-distance and the ephemerides (data about satellite orbits).

As set forth above, this embodiment is arranged to process the data on time series in a digital signal processing circuit for one channel. Hence, the function of the multi-channel digital processing circuit can be achieved by one-channel hardware. Further, the embodiment does not need collection of the almanac, resulting in reducing the time needed in measuring the position of the GPS receiver to a quite short time. Since the processing time consumed at the steps S41 to S43 of FIG. 11 is as short as 0.5 minute, assuming that the number of the receivable GPS satellites is 8, the processing time needs only four minutes ($=0.5$ minute$\times 8$). This processing time is a small fraction of the time of 12.5 minutes consumed in collecting the almanac in the known PGS system.

The time needed in keeping the antenna directed toward the sky corresponds to one page of the GPS signal, that is, about 30 seconds. Hence, the time needed in supporting the GPS receiver is greatly reduced to a quite short time, resulting in greatly reducing the burden of the user.

The data stored in the memory 64 such as an IC memory is allowed to be read from the memory 64 at any speed. Hence, by reading the data from the reading circuit 65 at an n-multiplied clock of the sampling frequency, the processing time consumed at the steps S41 to S43 is reduced to 1/n. For example, by reading the data at an 8-multiplied clock of the sampling frequency, the time consumed in processing the GPS signals sent from the eight satellites is as short as 0.5 minute$\times 8/8 = 0.5$ minute (30 seconds).

As the memory, a magnetic medium such as a magnetic tape or a magnetic disk, or a recording medium except the magnetic and semiconductor medium may be used. The digital signal processing circuit may provide two or more channels.

Many widely different embodiments of the present invention may be constructed without departing from the spirit and scope of the present invention. It should be understood that the present invention is not limited to the specific embodiments described in the specification, except as defined in the appended claims.

What is claimed is:

1. A receiver for Global Positioning System (GPS) comprising:

receiving means for receiving GPS signals transmitted from GPS satellites located within a receivable field and transmitting in a common frequency band in an overlapping manner;

first converting means for converting said GPS signals into an Intermediate Frequency (IF) signal;

second converting means for converting said IF signal into a digital signal;

storing means for storing said digital signal at a predetermined interval of time;

reading means for reading said digital signal stored in said storing means;

detecting means for detecting ephemeris data from said digital signal read by said reading means until a number of said ephemeris data equals a number of said GPS satellites, each of said ephemeris data corresponding to one of said GPS satellites;

collecting means for collecting said ephemeris data detected by said detecting means;

calculating means, coupled to said collecting means, for calculating distance data and accuracy data from said ephemeris data, after collection by said collecting means, respectively;

selecting means, for selecting a predetermined number of distance data and corresponding ephemeris data, in accordance with respective values of said accuracy data; and position deriving means, for deriving position data of said receiver, by using said distance data and corresponding ephemeris data selected by said selecting means, wherein said selecting means selects said distance data and corresponding ephemeris data so as to minimize any error in said derived position data.

2. A GPS receiver according to claim 1, wherein said collecting means omits collection of said ephemeris data of one of said GPS satellites whenever said detecting means fails to detect said ephemeris data of said one of said GPS satellites.

3. A GPS receiver according to claim 1, wherein said storing means stores said digital signal at 30-second intervals.

4. A GPS receiver according to claim 1, wherein said selecting means selects four distance data and corresponding ephemeris data, in accordance with said values of said accuracy data preferentially selecting those data having the smallest error.

5. A GPS receiver according to claim 1, wherein said reading means reads said digital signal stored in said storing means at a rate which is an integer multiple of a storing rate at which said storing means stored said digital signal.

6. A GPS receiver according to claim 5, wherein said reading means reads said digital signal stored in said storing means at a rate which is 8 times the storing rate at which said storing means stored said digital signal.

7. A GPS receiver according to claim 1, wherein said storing means is an integrated circuit memory.

8. A receiver for Global Positioning System (GPS) signals comprising:

receiving means for receiving GPS signals transmitted from GPS satellites located within a receivable field and transmitting in a common frequency band in an overlapping manner, first converting means for converting said GPS signals into an Intermediate Frequency (IF) signal, second converting means for converting said IF signal into a digital signal;

storing means for storing said digital signal at a predetermined interval of time;

reading means for reading said digital signal stored in said storing means;

detecting means for detecting ephemeris data from said digital signal read by said reading means until a number of said ephemeris data equals a number of said GPS satellites, each of said ephemeris data corresponding to one of said GPS satellites;

collecting means for collecting said ephemeris data detected said detecting means;

calculating means coupled to said collecting means, for calculating distance data and accuracy data from ephemeris data, after collection by said collecting means, respectively;

selecting means, for selecting a predetermined number distance data and corresponding ephemeris data, in accordance with respective values of said accuracy data; and position deriving means, for deriving position data of said receiver, by using said distance data and corresponding ephemeris data selected by said selecting means, wherein said selecting means selects said distance data and corresponding ephemeris data so as to minimize any error in said derived position data, and wherein said detecting and collecting means collect said ephemeris data for each satellite within a period not exceeding 30 seconds and said position deriving means completely derives said position within a period not exceeding n times 30 seconds, where n is the number of satellites from which ephemeris data were collected.

9. A receiver for Global Positioning System (GPS) signals comprising:

receiving means for receiving GPS signals transmitted from GPS Satellites located within a receivable field and transmitting in a common frequency band in an overlapping manner, first converting means for converting said GPS signals into an Intermediate Frequency (IF) signal, second converting means for converting said IF signal into a digital signal;

storing means for storing said digital signal at a predetermined interval of time;

reading means for reading said digital signal stored in said storing means;

detecting means for detecting ephemeris data from said digital signal read by said reading means until a number of said ephemeris data equals a number of said GPS satellites, each of said ephemeris data corresponding to one of said GPS satellites;

collecting means for collecting said ephemeris data detected by said detecting means;

calculating means coupled to said collecting means, for calculating distance data and accuracy data from ephemeris data, after collection by said collecting means, respectively;

selecting means, for selecting a predetermined number of distance data and corresponding ephemeris data, in accordance with respective values of said accuracy data; and position deriving means, for deriving position data of said receiver, by using said distance data and corresponding ephemeris data selected by said selecting means, wherein said selecting means selects said distance data and corresponding ephemeris data so as to minimize any error in said derived position data, wherein said detecting and collecting means collect said ephemeris data for each satellite within a period not exceeding 30 seconds and said position deriving means completely derives said position within a period not exceeding n times 30 seconds, where n is the number of satellites from which ephemeris data were collected, and wherein said receiver uses time-series processing in a single-channel device to simulate a multiple-channel digital processing circuit, and derives a Geometrical Dilution of Precision (GDOP) coefficient within a period not exceeding n times 30 seconds.

* * * * *